United States Patent [19]

Ehrhardt et al.

[11] 4,243,007
[45] Jan. 6, 1981

[54] SELECTIVE IGNITION TIMING

[75] Inventors: William M. Ehrhardt; Earl J. Haury, both of Houston, Tex.

[73] Assignee: Shell Oil Company, Houston, Tex.

[21] Appl. No.: 24,121

[22] Filed: Mar. 26, 1979

[51] Int. Cl.³ .................. F02P 5/04; G01L 23/22
[52] U.S. Cl. ........................ 123/419; 123/416; 123/425; 73/35
[58] Field of Search .......... 123/117 R, 117 D, 148 E, 123/119 ED, 146.5 A, 32 EA, 119 EC; 73/35

[56] References Cited

U.S. PATENT DOCUMENTS

| | | | |
|---|---|---|---|
| 3,822,583 | 7/1974 | Keller et al. | 73/35 |
| 3,903,856 | 9/1975 | McDougal et al. | 123/117 R |
| 3,957,023 | 5/1976 | Peterson | 123/117 R |
| 4,009,699 | 3/1977 | Hetzler et al. | 123/146.5 A |
| 4,010,358 | 3/1977 | Morris | 73/35 |
| 4,036,190 | 7/1977 | Bigliani et al. | 123/146.5 A |
| 4,120,272 | 10/1978 | Douaud et al. | 123/117 D |

Primary Examiner—P. S. Lall

[57] ABSTRACT

An ignition system for spark-ignited internal combustion engines that measures the octane requirement of individual cylinders and optimizes the spark advance timing of the individual cylinders.

13 Claims, 2 Drawing Figures

SELECTIVE IGNITION TIMING

BACKGROUND OF THE INVENTION

The present invention relates to ignition systems for internal combustion engines and particularly to an ignition system for optimizing the ignition timing of a four-cycle internal combustion engine.

It has been discovered that in a multi-cylinder four-cycle internal combustion engine the octane requirement of a few cylinders; for example, one or two, will greatly exceed the octane requirement of the remaining cylinders. The term 'octane requirement' refers to the octane number of the fuel required to obtain substantially knock-free performance from an engine or a particular cylinder at the designed ignition timing. The term 'knock' refers to the condition where a fuel auto-ignites in the cylinder causing severe pounding or knocking. It is the present practice to adjust the ignition timing of the engine so that the engine has no audible knock when operating on a particular gasoline. With this adjustment, the majority of the cylinders are operating with a retarded ignition timing while one or two are operating at or near the optimum timing.

At the present state in development of internal combustion engines, particularly those for use in automobiles and light duty vehicles, emission standards require the use of a catalytic converter. The use of a catalytic converter requires the use of unleaded gasoline. It is extremely expensive to increase the octane rating of unleaded gasoline since any increase requires quality high octane components that are only available from sophisticated refining operations. Thus, it has been the practice to retard the ignition timing on modern automobile engines operating on unleaded gasoline to eliminate, or at least reduce, their tendency to auto-ignite or knock. Normally, a clean engine will operate on available regular unleaded gasoline at near its designed ignition timing but as deposits build up in the cylinder heads with use, the tendency to pre-ignite or knock increases. As explained above, the auto-ignition or knocking of the engine usually occurs in only one or two cylinders in a multi-cylinder engine. For example, in a 1977 8-cylinder automotive engine, the clean engine octane requirement was approximately 84 octane. After the deposit buildup had reached equilibrium, six of the cylinders required approximately 90 octane while one cylinder required 93 octane and one cylinder required 95 octane. If an attempt was made to run this engine without knock, the ignition timing would have to be severely retarded to prevent the cylinder that required a 95 octane gasoline from knocking. This amount of ignition timing retardation would severely affect the efficiency of the remaining six cylinders which required only a 90 octane gasoline. The loss in efficiency would affect the overall economy of the engine as well as its performance.

BRIEF DESCRIPTION OF THE INVENTION

The present invention solves the above problems by providing an ignition system in which the ignition timing can be adjusted for each individual cylinder. Two embodiments of the invention are described in detail with one embodiment being a system for testing an engine to determine the octane requirement of individual cylinders and the second being a complete system which continually adjusts the ignition timing of individual cylinders in a multi-cylinder engine to obtain optimum performance and efficiency. Both systems utilize the major components of the electronic ignition systems presently installed on modern automobiles. The system utilizes the inductive pickup of present ignition systems to trigger delay circuits which determine the timing delay of the ignition system and then supply a signal to the switching amplifier of the electronic ignition system. When it is desired to determine the octane requirement of an individual cylinder, an inductive pickup is placed on the spark plug lead of the last cylinder in the engine's firing order. The inductive pickup supplies a signal which, in conjunction with a selected switch, can be used to interrupt the normal delay signal so that the ignition timing of the selected cylinder can be individually adjusted. This will permit the operator to determine the octane requirement of individual cylinders.

The second embodiment in the invention utilizes the inductive pickup of the electronic ignition system to control a memory and microprocessor module to provide the delay in the ignition timing. The system is re-set once for each complete cycle of the ignition system by a signal from the last cylinder in the firing order. In addition, the system includes a knock-sensing device which determines when an individual cylinder knocks. This determination is supplied to the memory circuit so that it can include a greater delay in the ignition timing of that cylinder in the next cycle of the engine. To eliminate the possibility of the knock system picking up extraneous noises or knocking of other engine components, it is gated on during the combustion period for a very short interval. The signal from the memory circuit is used to control the delay in ignition circuits of the first embodiment which then supplies a signal to the switching amplifier of the electronic ignition system.

BRIEF DESCRIPTION OF THE DRAWINGS

The present invention will be more easily understood from the following detailed description of a preferred embodiment when taken in conjunction with the attached drawings in which.

PREFERRED EMBODIMENTS

As used in this description, the term 'octane number' of a gasoline refers to the research octane number of the gasoline plus the motor octane number of the gasoline, both determined by accepted testing methods, divided by two. Likewise, when reference is made to the octane requirement of an engine or a particular cylinder of an engine, it refers to the octane number of the gasoline required for the engine to operate at a particular speed and load condition with only a trace of pre-ignition or detonation of the mixture.

Figure 1:
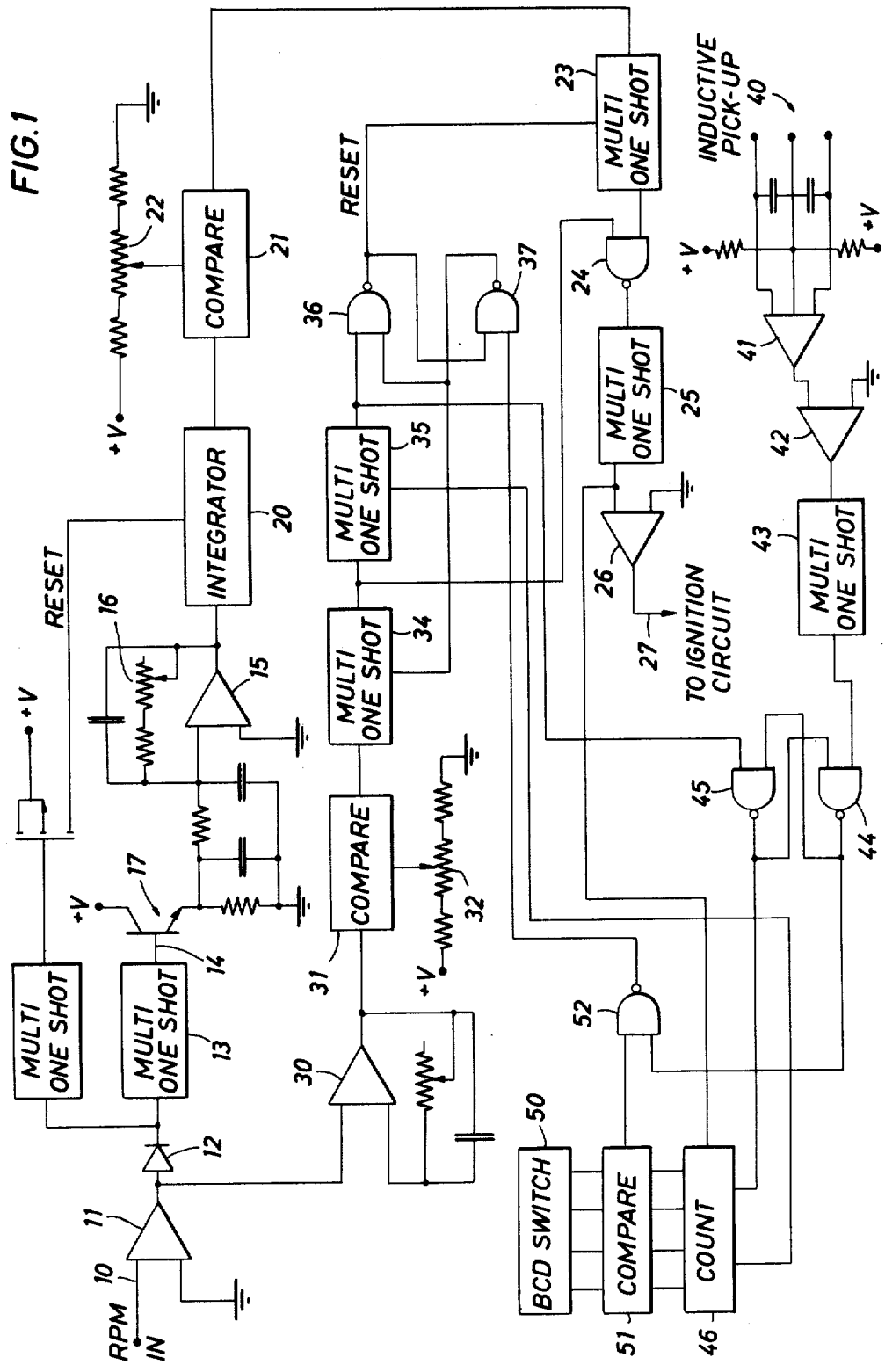
FIG. 1 is a block diagram of one form of the invention.

Referring now to FIG. 1, there is shown a block diagram of a system for determining the octane requirement of individual cylinders of a multi-cylinder engine. 10 indicates a signal related to the speed of the engine and particularly a signal from the inductive pickup on the electronic ignition system of the engine. This signal will normally be an alternating signal having frequency equal to engine RPM times number of cylinders divided by two. The signal 10 is amplified by an amplifier 11 with a diode 12 being used to prevent the passage of the negative-going portion of the signal. The circuit 13 comprises a single shot multivibrator that produces an output signal whenever the positive-going portion of the input signal exceeds its trigger level. Thus, the output signal from the circuit 13 will be a signal indicating the zero crossing of the input signal in a negative to a positive direction. The zero crossing signal on lead 14 is used to trigger the frequency to voltage converter comprising transistor 17 and its associated circuit. The gain of the amplifier 15 is controlled by its feedback circuit 16 and its output voltage controls the slope of the ramp voltage produced by the integrator 20. Thus, the slope of the ramp voltage follows the engine speed and is supplied to the comparing circuit 21. The comparing circuit compares the amplitude of the ramp voltage with a voltage level which is set on a variable resistance 22. When the two are equal, a signal is supplied to a single shot multivibrator circuit 23. The combination of the integrator and the comparing circuit 21 provides a means for adjusting the delay or advance in the ignition timing since an increase in the voltage level of the source 22 will provide more delay in the circuit while decreasing the voltage level, will, of course, provide advance. Since the zero crossing signal is related to the desired ignition point of the next cylinder in the firing order the delay between the time the zero crossing and the point of ignition can be used to control the ignition timing of all cylinders in the engine.

The single shot multivibrator 23 supplies a signal to a NAND gate 24 whose output is used to trigger a single shot multivibrator 25. The output from the multivibrator 25 is amplified by an amplifier 26 and supplied as a signal on the lead 27 to control the switching amplifier of the electronic ignition system of the engine. From the above description, it can be seen that the system uses the timing signal from the inductive pickup of the electronic ignition system and provides a means for varying the delay of the signal to provide the proper ignition timing for the engine. This permits the operator to adjust the engine ignition timing to a desired position prior to selecting a cylinder whose octane requirement is to be checked.

The zero crossing signal is supplied to an amplifier 30 and a delay circuit comprising the comparer circuit 31 and single shot multivibrators 34 and 35. This circuit is provided so that the ignition timing of the selected cylinder can be individually controlled. Comparing circuit 31 is provided with a set point voltage signal from a variable voltage source 32 so that the delay period for the selected cylinder may be adjusted as desired. The single shot multivibrators 34 and 35 in combination with the NAND circuits 36 and 37 provide a means for interrupting the single shot multivibrator 23. This allows the output signal from the single shot multivibrator 34 to control the NAND gate 24 and trigger the ignition system of the selected cylinder.

The selected cylinder is determined by an inductive pickup 40 which is coupled to the spark plug lead of the last cylinder in the engine's firing order. This signal is amplified by two amplification stages 41 and 42 and supplied to a single shot multivibrator 43. The single shot multivibrator 43, in combination with two NAND gates 44 and 45, control the operation of a counter 46. Once each ignition cycle the counter 46 is reset by a signal from the single shot multivibrator 35. Counter 46 counts the pulses received from the single shot multivibrator 25 that produces an output signal for each cylinder in the engine. The counter continuously supplies its output to a comparing circuit 51 wherein the number is compared with a number received from a binary counter switch 50. Thus, the operator can set the switch 50 to the desired cylinder number. The comparing circuit 51 will supply an output signal when this cylinder is reached and in combination with NAND gate 52, will control the NAND gate 37.

From the above description, it can be seen that the circuit of FIG. 1 provides both a means for selecting the overall ignition timing of the engine and then individually adjusting the ignition timing of a selected cylinder of the engine. Of course, the circuit of FIG. 1 must be used in combination with a suitable knock or detonation detecting means so that the octane requirement of the selected cylinder can be determined. If desired, the knock detector can be used to control the ignition timing of the selected cylinder as descreibed below in connection with FIG. 2. When testing the individual cylinders of an engine to determine their octane requirements, all cylinders except the selected cylinder have their ignition timing retarded sufficiently to insure that they will not knock. This can be done by adjusting the voltage level 22. The ignition timing of the selected cylinder is then set at the designed specification by adjusting the voltage level 32. The test fuel supplied to the engine can then be varied to determine the octane requirement of the selected cylinder. Suitable detonation detecting means and methods for testing engines to determine the octane requirement are well known to those skilled in the art.

Figure 2:
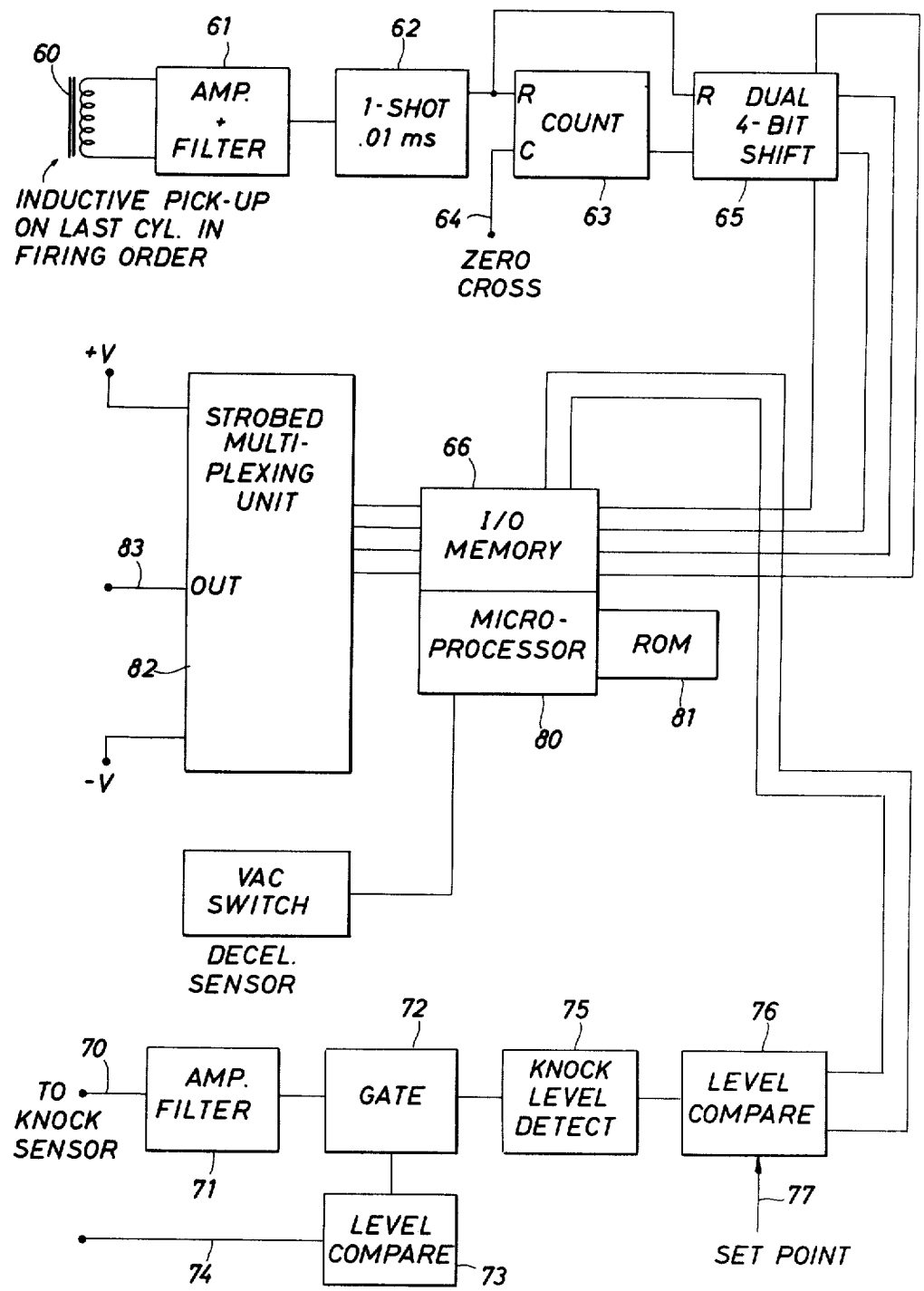
FIG. 2 is a block diagram of a second form of the invention which is useful in multi-cylinder engines.

Referring now to FIG. 2, there is shown a system for automatically adjusting the ignition timing of each cylinder of a multi-cycle engine to provide the optimum ignition timing. The circuit in FIG. 2 utilizes an inductive pickup 60 to detect the firing of the last cylinder in the firing order of the engine. This signal is amplified and filtered by circuit 61 and then supplied to a single shot multivibrator 62. The signal from the multivibrator 62 is used as a reset signal for the counter 63 and the dual four bit shift register 65. Counter 63 also receives a signal 64 from the zero crossing circuit shown in FIG. 1. For example, the signal can be taken from the lead 14 of FIG. 1. Thus, the counter will count the firing of the individual cylinders while the shift register will supply a suitable binary number to the in and out memory 66. The signal supplied to memory 66 causes the microprocessor 80 to select from the Read Only memory storage 81 the desired timing for the next cylinder in the firing order. The microprocessor 80 may be a Zilog 280 supplied by Zilog Corporation or an 8080 supplied by Intel Corporation that is preprogrammed to carry out the various functions in response to various inputs. The selected timing signal in binary form will be supplied to a strobed multiplexing unit 82 where it can be converted to an analog voltage output signal on the lead 83. This voltage is used as the set-point for comparer 21 and compared with the sawtooth voltage generated by the integrator 20. When the two are equal, it will supply an output signal on the lead 83 which can be used to trigger the ignition switching amplifier. The comparing of a sawtooth voltage with the voltage representing the desired ignition timing permits adjustment of the timing in relatively small increments to any desired value. For example, a sawtooth voltage can be selected in which the 250 millivolts equal 2 degrees of ignition timing. The Read Only memory 81 will supply a digital signal representing the desired spark timing based on the computation of the unit 80. This digital number can then be supplied to the multiplex unit to determine the actual ignition timing.

Also shown in FIG. 2 is a system for determining the knock level of the individual cylinders and supplying a suitable signal to the computing unit 80. In particular, a signal from a standard knock-sensing device is supplied on a lead 70 to an amplifier filter circuit 71. This signal is supplied to a gate circuit 72 that is controlled by a signal from the level comparing circuit 21 of FIG. 1. Thus, when the two signals are equal they will open the gate 72 and pass the signal from the knock sensor to the computing unit 80. Knock level detecting circuit 75 is used to discriminate against extraneous noise and pass only true knock signals to a level comparing circuit 76. The comparing circuit 76 compares the true knock signal with a set point 77 which relates to the acceptable knock level of the cylinder. When the comparing circuit detects a knock signal exceeding the acceptable knock level, it passes a signal to the in/out memory circuit 66. Upon receipt of the knock signal, the microprocessor 80 will retard the spark a preset amount or step. This can be done by selecting a binary number from the Read Only memory 81 which corresponds to the preset amount and will decrease in the voltage level supplied to the multiplexing unit 82. Memory 66 should retain the setting from the last firing of a particular cylinder so that in the absence of a signal from the knock circuit it can advance the spark timing of the cylinder one preset step. This will ensure that the engine always advances the timing to the point at which a knock is detected at which point it will retard the ignition.

In addition to the above, the circuit could also include a suitable program in the memory and microprocessor to retard the spark rapidly upon detecting a knock or retard the spark by a much larger preset step than it has advanced. This would eliminate or greatly reduce the damage to the engine caused by excessive knocking.

A suitable program in the memory would also limit maximum advance to a predetermined level as required by emission control system requirements. A vacuum operated switch would notify the microprocessor of deceleration conditions and the program would hold the ignition timing settings at their last position, thus preventing excessive advance during deceleration from causing severe knock when returning to cruise.

I claim as my invention:

1. An ignition optimizing circuit for multiple cylinder internal combustion engines, said engines being equipped with an electronic ignition system including a switching amplifier that controls the switching of low voltage current in the ignition coil, said optimizing circuit comprising:
   control means responsive to engine speed for supplying a control signal whose frequency equals the engine speed times the number of cylinders divided by two;
   counting means for counting the cycles of said control signal and converting the count to a digital number;
   reset means coupled to said counting means to reset said counting means once for each two revolutions of the engine;
   memory and microprocessor means, said counting means being coupled to said memory and microprocessor means to cause said memory means to produce an output signal related to the desired ignition timing of each cylinder; and,
   multiplexing means coupled to said memory means and responsive to said output signal to produce a pulse for actuating the switching amplifier of the electronic ignition system.

2. The ignition optimizing circuit of claim 1 wherein said control means is an inductive pickup.

3. The ignition optimizing circuit of claim 1 wherein said counting means comprises a resettable counter and a digital shift register.

4. The ignition optimizing circuit of claim 1 wherein said memory responses to the output of said shift register to supply an output signal related to the ignition timing of a cylinder.

5. The ignition optimizing circuit of claim 4 wherein said memory advances said ignition timing for each cylinder a preset amount in subsequent cycles of the engine and an interrupting means coupled to said memory for interrupting said advancing of the ignition timing when desired.

6. The ignition optimizing circuit of claim 5 wherein said interrupting means is responsive to knocking in said each cylinder.

7. The ignition optimizing circuit of claim 5 wherein the advancing of said ignition timing is interrupted by deceleration of the engine.

8. The ignition optimizing circuit of claim 6 wherein said memory will retard the ignition timing of said one cylinder in response to said interrupting means.

9. The ignition optimizing circuit of claim 6 wherein said knocking is detected by a knock-sensitive circuit that is gated on for a short time interval during the combustion period in said one cylinder.

10. The ignition optimizing circuit of claim 1 wherein the ignition timing for the last firing of each cylinder is retained in said memory.

11. The ignition optimizing circuit of claim 1 wherein the ignition timing signal supplied by the memory means is a digital signal and said multiplexing unit converts said digital signal to an analog voltage, said analog voltage being compared to a ramp voltage to produce the pulse for actuating said switching amplifier.

12. An ignition circuit for use in determining the octane requirement of a selected cylinder of a multiple cylinder engine comprising:
   a circuit means coupled to the engine for producing a plurality of ramp voltages whose slopes are related to the engine speed, said circuit producing a separate ramp voltage for firing each cylinder;
   comparing means coupled to said circuit means for comparing the instantaneous value of said ramp voltage with a preset voltage to produce an ignition signal when said ramp and preset voltages are equal;
   ignition means coupled to said comparing means and responsive to said ignition signal for firing all cylinders except said selected one;
   counting means for counting the number of ignition signals produced and supplying an interrupting signal when the position of said selected cylinder in the firing order of said engine is reached, said counting means being reset once in each cycle of said firing order, said interrupting signal being used to inactivate the coupling between said comparing means and said ignition means; and,
   delay circuit means for producing a delay signal, said delay circuit being coupled to said ignition means when the coupling between said comparing means and said ignition means is inactivated.

13. The ignition system of claim 12 wherein said delay means includes a second comparing circuit for comparing a signal related to engine speed with a preset voltage level.

* * * * *